Patented Oct. 13, 1931

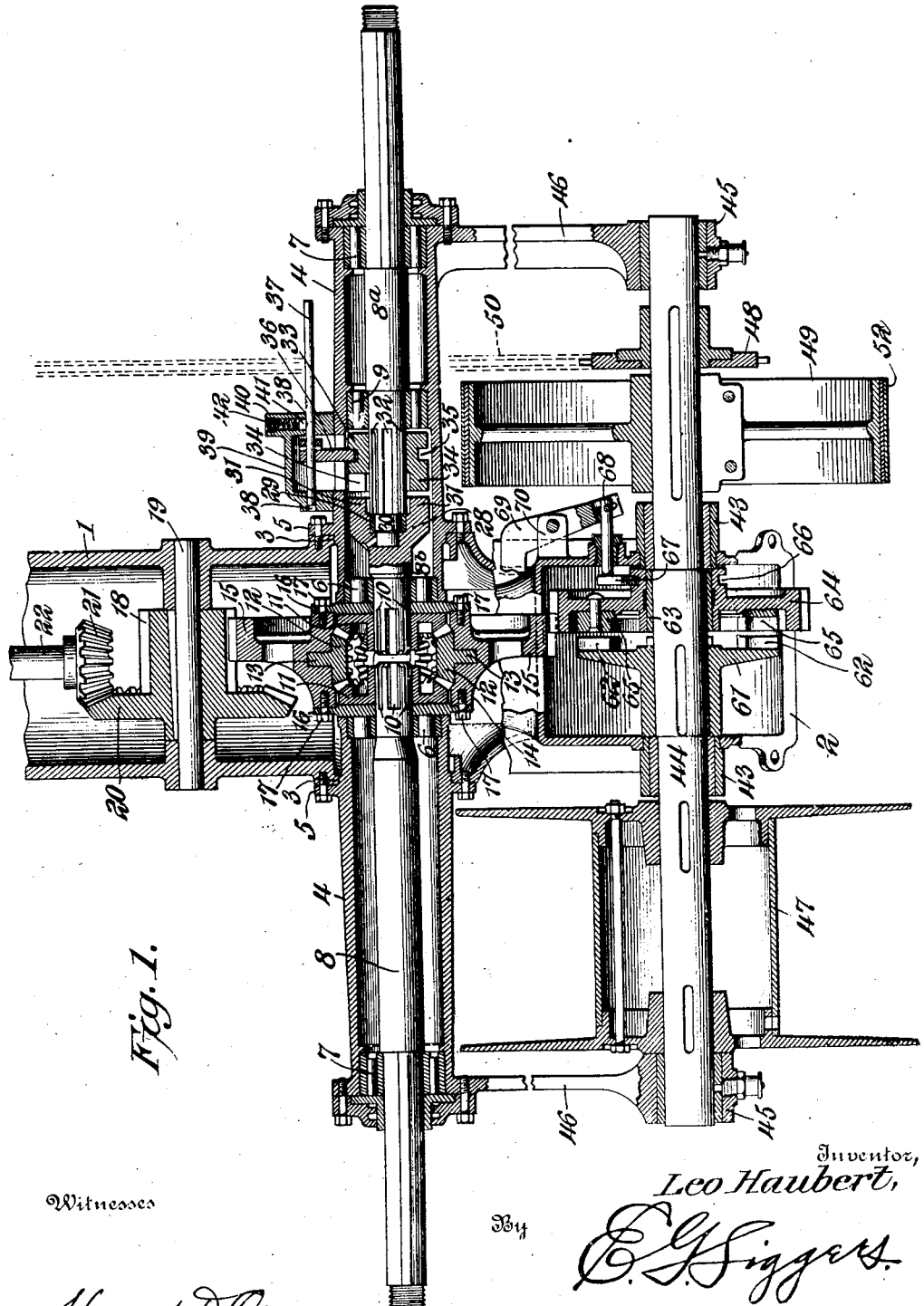

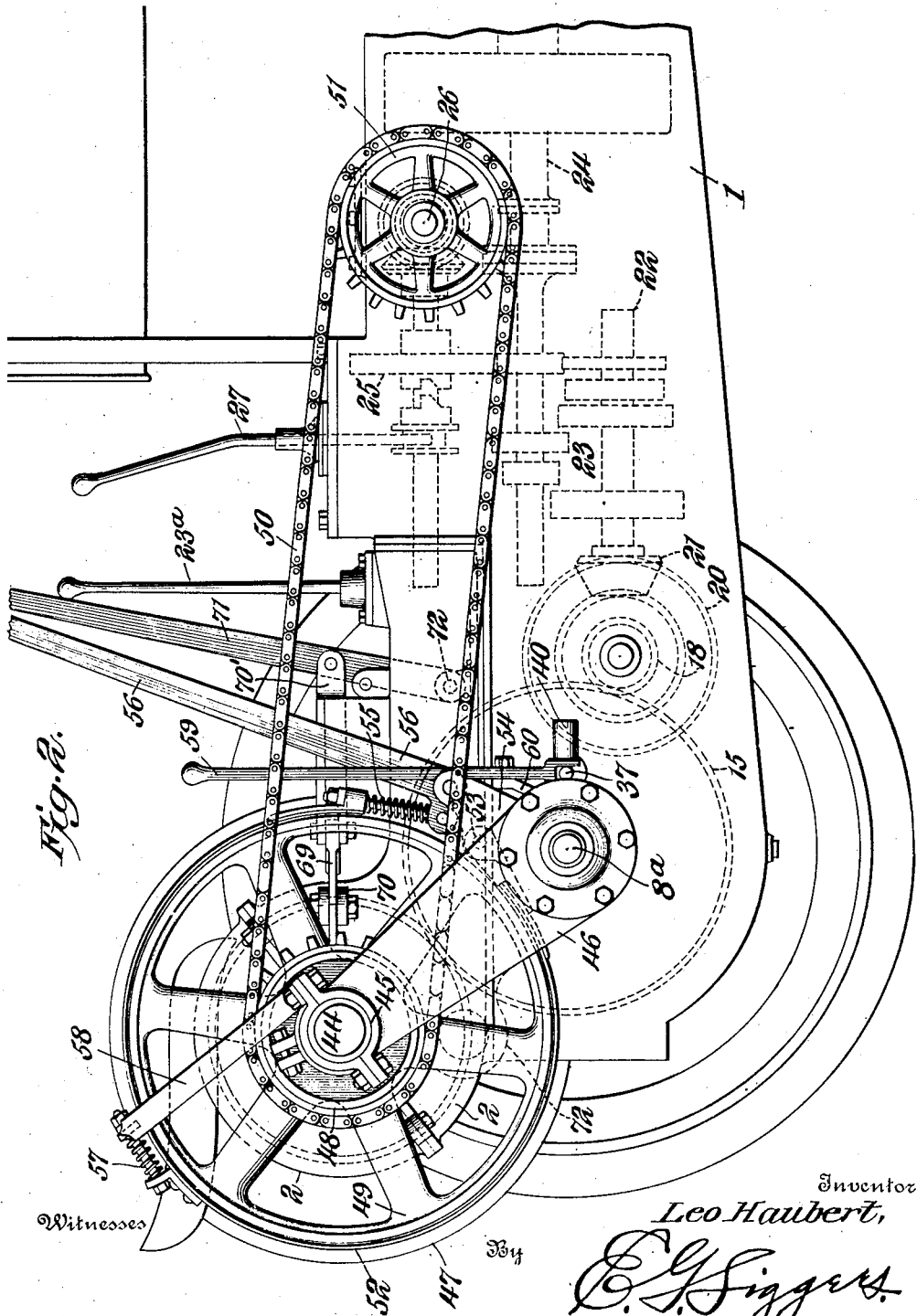

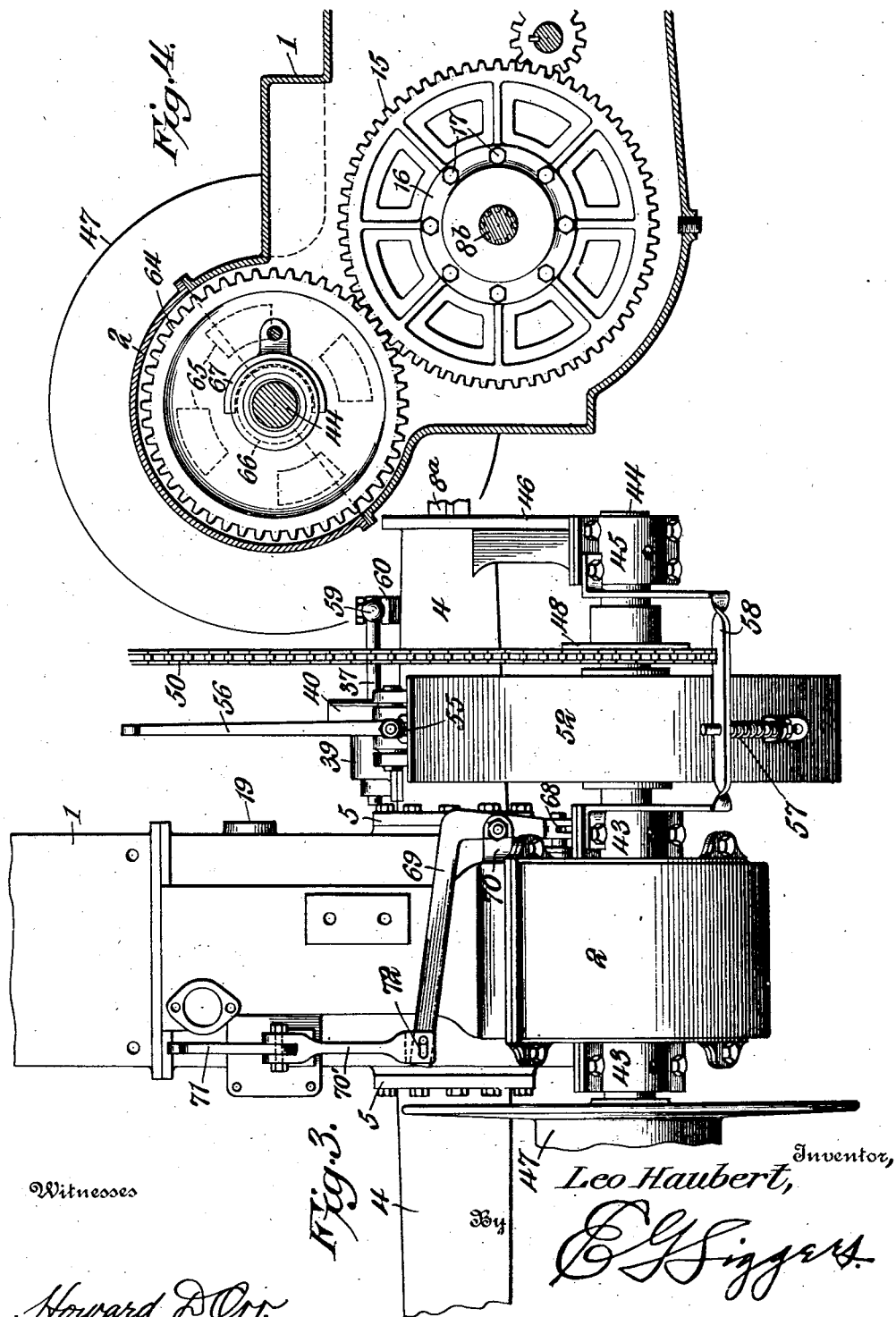

1,827,655

UNITED STATES PATENT OFFICE

LEO HAUBERT, OF TULSA, OKLAHOMA, ASSIGNOR OF ONE-THIRD TO JOHN A. WOLFE AND ONE-THIRD TO JOHN CHARLES BENNETT, BOTH OF TULSA, OKLAHOMA

POWER DELIVERING ATTACHMENT FOR AUTOMOBILE TRUCKS OR TRACTORS

Application filed March 9, 1926. Serial No. 93,404.

This invention relates to power delivering attachments for automobile trucks or tractors, and the subject matter of the present application is an improvement on the structure shown and described in my Patent No. 1,586,675, dated June 1, 1926.

One of the objects of the invention is to simplify the construction and to enable the installation of the same into the structure of existing or specially built machines of this class at a low cost and with a minimum amount of change or alteration thereof.

Another object is to provide a structure of few parts, whereby power may be transmitted in a more direct manner from the power unit of the machine to the winding drum of the attachment to cause the latter to be rotated for winding a cable at the desired speed, depending on the selective gearing of the usual transmission group of the automobile truck or tractor.

A further object is to provide means for rapidly rotating the winding shaft and drum in a reverse direction to quickly unwind the cable when desired, said means directly connecting the drum shaft and the usual power take-off shaft of machines of this character, and independently of the drum-driving means, so that, when the latter is disconnected from the power, and one of the wheels of the machine is likewise disconnected from the differential, the unwinding operation may quickly take place under power, it being understood that the drum may also freely unwind through the weight of the cable and load carried thereby while under proper control by suitable braking means.

A full and complete understanding of the invention may be obtained from a consideration of the following detailed description, taken in connection with the accompanying drawings forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a substantially horizontal sectional view through the rear axle structure of a tractor and showing the improvements applied thereto, the traction wheels being omitted.

Figure 2 is a side elevation of the rear end of the tractor, one rear wheel being omitted.

Figure 3 is a top plan view, parts being broken away.

Figure 4 is a longitudinal sectional view through the differential housing and adjoining parts.

Referring to the drawings, the numeral 1 indicates the tubular casing of an ordinary tractor, and such type of machine has been illustrated in connection with the invention for the reason that the latter is of more practicability therewith, but may also be built in and used with other forms of machines, such as automobile trucks.

At the rear end, this casing is formed into an upwardly and rearwardly extending, circular housing 2, the central, transverse axis of which is arranged parallel to the axis of the vehicle axles, and the upper half of the said housing 2 is removable, as clearly shown in Fig. 2 of the drawings.

The rear end of the casing 1 constitutes the differential housing, and is provided in either side wall, with a circular opening 3, said openings being arranged in alinement transversely of the machine and adapted to receive the inner ends of opposite axle housings 4, the same being preferably tapered towards their outer ends and of tubular form. The housings 4 are held to the rear end of the casing 1 by means of outstanding, circular flanges 5 which are suitably apertured for the reception of fastening bolts as shown in Figure 1 of the drawings.

The inner ends of the axle housings 4 extend inwardly beyond the walls of the casing 1 and each is provided with an interior channel or seat for an anti-friction roller unit 6, while the outer ends of the axle housings are similarly provided with seats for the reception of outer anti-friction roller units 7 to bear in the usual manner on the axles through the customary wear sleeves or bushings, the said axles being of considerably smaller diameter than the interior of said housings.

The left hand axle 8 of the tractor is formed of a single length and projects beyond the outer end of the housing to receive the usual tractor wheel, while at the right hand side of the machine, the axle proper 8$^a$ is somewhat shorter and is intermediately mounted in a roller bearing 9, the inner extended end being adapted to coact with an interposed short shaft or stub axle 8$^b$, whose inner end, as well as the inner opposed end of the left hand axle 8, are within close proximity with each other substantially at the center of the machine.

The axle 8 and stub axle 8$^b$ are each provided with longitudinal grooves 10 for interlocking connection with bevelled gears 11 forming part of the differential of the machine, and said gears 11 coact in the usual manner with a plurality of planetary gears 12 having trunnions 13 mounted in the hollow, circular hub portion 14 of a master gear 15, which extends somewhat into the circular housing 2.

Interposed between the gears 11 and the inner ends of the axle housings 4, are opposite side plates or discs 16 having each a central aperture for the adjacent axles and each being secured to the outer faces of the said hub portions of the master gear, by means of a plurality of bolts 17, the said plates completely enclosing and housing the gears 11 and 12.

The master gear 15 meshes with a drive pinion 18 mounted in the casing 1 upon a transversely disposed shaft 19 whose ends are mounted for rotation in bearings formed in the walls of said casing, and upon said shaft there is also mounted a bevelled gear 20, which may be formed integrally with the pinion as shown, or otherwise, the gear 20 being driven by a bevelled pinion 21 carried by a shaft 22 extending longitudinally and centrally of the casing 1 and forming part of the ordinary transmission gearing 23 of the tractor. The shaft 22 and the motor shaft 24 are equipped with suitable selective gears for coaction with each other by means of the shift lever 23$^a$ for driving the differential at different rates of speed in a well known manner, no special attempt being made to show or describe such selective means in the drawings or description.

Arranged above the longitudinally disposed motor shaft 24, is a third shaft upon which is mounted a gear 25 meshing with one of the selective group and having at its forward end, other gear connection with a transverse, power-take-off shaft 26, the gear 25 being adapted to be thrown into and out of connection with the take-off shaft 26 by means of an ordinary clutch lever 27 mounted to rock in the usual manner and to move a clutch member longitudinally into engagement with the hub of the wheel 25.

The outer end of the stub shaft 8$^b$ is provided with an enlarged head 28 which overhangs the inner end of the right hand axle 8$^a$ and is provided with a stepped seat 29 in which there is located a bushing to form a bearing for the reduced end 30 of said axle 8$^a$. The head 28 is provided on its end face with clutch teeth or projections 31 and the inner end portion of the axle 8$^a$ is longitudinally grooved, as at 32, for interlocking connection with a slidable clutch member 33 which is likewise provided with clutch teeth or projections 34 in its inner end face to engage the teeth or projections 31 of the stub axle, when moved longitudinally in the grooves 32. The member 33 is provided with an annular groove 35 for engagement by a yoke 36 extending forwardly through a longitudinal slot formed in the front wall of the right hand axle housing 4 and said yoke is secured to and actuated by a slidable rod 37 mounted in spaced bearing openings 38 of a forwardly extending housing 39 secured in surrounding relation to the aforesaid slot in the right hand axle housing and, together with the slot, permitting the movements of the yoke 36. The housing 39 is in the form of a hollow casting and includes a tubular extension 40, the passageway through the same communicating with the outer bearing opening 38, and at the inner end of said passageway there is located a longitudinally movable plug 41 having a point to engage in depressions in the slidable rod 37, and held in such engagement by a coiled spring 42, the outer end of the passageway being closed by a suitable screw plug. The plug 41 permits the clutch yoke 37 to be shifted from locked to unlocked position, by means to be later described, but serves to prevent accidental dislodgment of same when set in either of said positions.

The rearwardly extending, circular housing 2 is provided with horizontally alined, concentric bearings 43 for the reception of the intermediate portion of a transversely disposed drum shaft 44 which is thus mounted to the rear of and above the axles at an angle of substantially forty-five degrees and the terminal portions of the drum shaft, where extending through and beyond the bearings 43, are reduced and have their ends mounted in similar terminal bearings 45 carried at the free ends of upwardly and rearwardly extending arms 46 cast integrally with or forming part of the tubular axle housings 4 as clearly shown in Figure 1 of the drawings.

Mounted upon the reduced portion of the drum shaft at the left hand side of the machine, is a suitable winding drum 47 which is keyed in position between the bearings 43 and 45 and is adapted to be rotated by the shaft while the right hand reduced portion of the latter carries a sprocket wheel 48 located adjacent to the outer bearing 45, and also a brake drum 49 of relatively large diameter and mounted on the shaft between the sprocket wheel and the intermediate bearing 43, the brake drum and the sprocket wheel being both keyed to the said shaft. The wheel 48 is adapted to be rotated by an endless sprocket chain 50 extending forwardly above the axle housings and parts carried thereby and is driven by a similar sprocket wheel 51 which is mounted on and driven by the aforesaid power take-off shaft 26 the end of which is extended at the right hand side of the tubular casing 1 and which is also extended on the other side for mounting an ordinary band pulley for driving different kinds of machinery, and thus, when the ordinary pulley clutch lever 27 is properly manipulated, power may be directed through the chain to the drum.

Surrounding the brake drum 49 is a band 52 having one end secured by a pin 53 in a bracket 54 forming part of the right hand tubular axle housing 4, while the other end of the brake band is secured by resilient means 55 to the angular lower end of an uprigh. operating lever 56 fulcrumed in the said bracket 54 and within easy reach of the righ. hand of the operator. The intermediate portion of the brake band is prevented from continually riding upon the circumferential surface of the brake drum by means of a resilient support 57 carried by an arm 58 having depending arms which are bolted to the caps of the bearings 43 and 45 at the right hand side of the machine.

The aforesaid slidable yoke-actuating rod 37 is pivotally connected, at its outer end, to an actuating handle lever 59 which is bifurcated at its lower end and at a slight distance above said connection, the lever is fulcrumed on an arm 60 carried by the right hand axle housing and adapted to be rocked transversely of the machine to throw the right hand traction wheel of the machine (not shown) into and out of connection with the differential gearing to cause the latter to move forwardly when the power is directed to both wheels, or to stand still when the clutch is disconnected, in a well known manner.

Mounted upon the drum shaft and within the circular housing 2 is a clutch disc 61 having a broad hub portion which is suitably keyed to said shaft and having on its right hand face a series of lugs or projections 62 adapted to act as clutch teeth, while between the disc and the right hand bearing 43 there is located a bushing 63 surrounding the shaft 44 and adapted to receive the hub portion of a slidable gear wheel 64 which is loosely mounted upon the bushing. The inner face of the gear wheel opposite the disc 61 is hollowed out for the reception of complementary clutch lugs or teeth 65 for coaction with the aforesaid teeth 62 of the disc when the wheel is shifted in a manner to be described. The teeth 62 may be formed integrally with the disc 61 but it is preferable to attach the teeth 65 of the gear wheel by rivets or otherwise so that the same may be renewed if desired.

The teeth of the gear wheel 64 are at all times in mesh with the teeth of the aforesaid master gear 15, even when said wheel 64 has been shifted to the right far enough to free the lugs 65 from the lugs 62 of the disc, thus considerable wear and tear on the teeth of the two gears is prevented and it will be seen that when the wheel 64 is shifted, by means to be described, to fully engage the coacting clutch members, the teeth thereof will be in full engagement with the master gear when the full power from the latter is directed to the drum shaft for winding purposes when the axle clutch is thrown out and the machine is standing.

The hub of the gear wheel 64 is extended to the right to abut against the inner face of the bearing 43 when disconnected from the disc 61 and said extension is provided with an annular groove 66 in which operates a shifting yoke 67 having an angularly disposed actuating arm 68 extending through the side of the casing and pivotally connected to the rearwardly directed arm of a bell crank lever 69 pivoted to a bracket 70 secured to the right hand side wall of the circular casing 2.

The bell crank lever 69 swings in a horizontal plane above the rear portion of the casing 1 and immediately in advance of the circular housing 2, as clearly shown in Figure 3 of the drawings, and the free end of the lever 69 is flexibly connected, at the left hand side of the said casing 2, to the rear end of a link 70' which is forked at its front end and pivotally connected to an actuating lever 71 suitably pivoted as at 72 upon an extension of the casting forming the rear portion of said casing.

From the foregoing it will be seen that a simple and cheaply manufactured and installed arrangement of parts has been provided for use in connection with tractors or the like whereby the power of the tractor motor may be utilized for winding a cable on a drum for hoisting or other purposes, either while the tractor is moving along the ground in either direction or while standing still, the improvements enabling the power to be derived directly from the master gear of the differential by the use of a single connecting gear wheel, thus reducing the number of necessary parts to a minimum; that the desired speed may be obtained directly through the selective gearing of the power transmission of the tractor and, when desired, the winding drum may be driven in a reverse

What is claimed is:—

1. A power delivering attachment for tractors having separate drive axles and differential gearing including a master gear, means for disconnecting one of the axles from the differential gearing, selective gearing connecting the master gear with the motor drive shaft, said selective gearing including a power take-off shaft, a drum shaft mounted on the frame of the vehicle, an extended cylindrical casing carried by the differential housing and communicating with the same, said casing having bearings for the intermediate portion of the drum shaft, arms connected to the axle housings and having bearings for the terminals of the drum shaft, a winding drum mounted on the drum shaft at one side and a brake drum mounted thereon at the other side of the intermediate bearings, a clutch disc keyed to the drum shaft within the casing, a gear wheel loosely mounted on the drum shaft within the casing and meshing at all times with the master gear, said gear wheel having clutch elements to coact with the clutch disc when shifted to drive the drum shaft at different speeds depending on the selective gearing, means for shifting the gear wheel into or out of connection with the clutch disc, a sprocket wheel mounted on the extended end of said take-off shaft, a second sprocket wheel mounted on the drum shaft, and an endless sprocket chain mounted on said wheels to rapidly revolve the winding drum in reverse direction when the clutch elements of the gear wheel and disc are disconnected.

2. A power delivering attachment for a motor truck and the like having a differential drive and a differential housing comprising, in combination; a drum shaft mounted adjacent to the differential housing; means to drive said shaft from the differential gearing; a clutch associated with said means; a power-take-off shaft on the truck; and driving connections between the power-take-off shaft and the drum shaft adapted to drive it at high speeds in reverse when the differential drive is disconnected.

3. A power delivering attachment for motor vehicles having separate drive axles and differential gearing between the same; said gearing having a housing carried by the frame of the vehicle and supporting the axle housings; one of the gears of the differential gearing extending through the rear end of the differential housing; a gear casing carried by and extending rearwardly of the differential housing; bearings formed in the opposite sides of the casing; a drum shaft mounted in said bearings; a clutch to disengage the drum shaft from the differential gearing; a brake on the drum shaft; and a power-take-off shaft on the motor vehicle connected to drive the drum shaft at high speed when said clutch is disengaged.

4. In combination with a motor vehicle, a winding drum; driving connections between the drum and the transmission gearing of the vehicle; a power take-off shaft driven by the motor vehicle connected to drive the drum at high speeds in reverse; and a clutch for controlling said connections.

5. In combination with a motor vehicle of the class described, a winding drum mounted on the vehicle; mechanism including connections to the vehicle transmission for driving the drum in one direction; a high speed reverse drive for the drum driven by the vehicle motor independently of said transmission mechanism; and a clutch for controlling said connections.

In testimony that I claim the foregoing as my own, I have hereto affixed my signature.

LEO HAUBERT